(12) United States Patent
Hasloecher et al.

(10) Patent No.: US 7,604,207 B2
(45) Date of Patent: Oct. 20, 2009

(54) TRIPOD AND METHOD

(75) Inventors: Kenneth J. Hasloecher, Deltona, FL (US); Simon Raab, Maitland, FL (US)

(73) Assignee: Faro Technologies, Inc., Lake Mary, FL (US)

( * ) Notice: Subject to any disclaimer, the term of this patent is extended or adjusted under 35 U.S.C. 154(b) by 936 days.

(21) Appl. No.: 10/392,056

(22) Filed: Mar. 19, 2003

(65) Prior Publication Data

US 2003/0178538 A1    Sep. 25, 2003

Related U.S. Application Data

(60) Provisional application No. 60/365,734, filed on Mar. 19, 2002.

(51) Int. Cl.
*F16M 11/38* (2006.01)
*B60B 33/06* (2006.01)

(52) U.S. Cl. .................. 248/171; 248/166; 248/434; 16/32; 16/34; 16/35 R; 280/763.1

(58) Field of Classification Search .............. 248/166, 248/167, 170, 171, 177.1, 188.6, 188.7, 188.91, 248/434, 435, 646; 211/203, 70.6, 70.8; 280/62, 47.33, 763.1, 764.1; 16/35 R, 19, 16/33, 34, 32, 44
See application file for complete search history.

(56) References Cited

U.S. PATENT DOCUMENTS

| | | | | | |
|---|---|---|---|---|---|
| 755,403 | A | * | 3/1904 | Sipe | 248/171 |
| 797,996 | A | * | 8/1905 | Watson | 116/20 |
| 1,759,165 | A | * | 5/1930 | Mayer | 248/182.1 |
| 1,894,457 | A | * | 1/1933 | Zerk | 248/181.1 |
| 1,902,166 | A | * | 3/1933 | Harter | 16/34 |
| 2,375,214 | A | * | 5/1945 | Creedon | 248/126 |
| 2,731,223 | A | * | 1/1956 | Riccio | 248/511 |
| 2,744,712 | A | * | 5/1956 | Brandt | 248/451 |
| 3,121,556 | A | * | 2/1964 | Faulkner | 254/2 R |
| 3,282,530 | A | * | 11/1966 | Rash | 242/127 |
| 3,312,432 | A | * | 4/1967 | Pfeiffer et al. | 248/646 |
| 3,437,296 | A | * | 4/1969 | Hinz | 248/354.5 |
| 3,970,835 | A | * | 7/1976 | Crete | 362/11 |
| 4,290,207 | A | | 9/1981 | Browning et al. | 33/295 |
| 4,458,870 | A | * | 7/1984 | Duncan et al. | 248/279.1 |
| 4,640,482 | A | | 2/1987 | Rogers | 248/168 |

(Continued)

FOREIGN PATENT DOCUMENTS

DE    91 09 160.8    9/1991

(Continued)

OTHER PUBLICATIONS

International Search Report, Mar. 19, 2003; PCT/US03/08561.

*Primary Examiner*—Anita M King
(74) *Attorney, Agent, or Firm*—Cantor Colburn LLP

(57) ABSTRACT

A tripod has an extensible strut for improving the stability thereof by tying the strut to a sturdy object. In another aspect of the invention, a method of using a tripod includes attaching the tripod to a sturdy object. In another aspect of the invention, a novel caster wheel mechanism permits easy relocation of the tripod. In another aspect of the invention, a multi-function support is provided. In yet another aspect of the invention, a tool rack is provided supported by the tripod.

13 Claims, 5 Drawing Sheets

U.S. PATENT DOCUMENTS

| | | | | |
|---|---|---|---|---|
| 4,852,836 A | * | 8/1989 | Kawazoe | 248/168 |
| 5,284,313 A | | 2/1994 | Hallgren | 248/279 |
| 5,402,582 A | | 4/1995 | Raab | 33/503 |
| 5,876,011 A | | 3/1999 | Blasing | 248/411 |
| 6,003,823 A | * | 12/1999 | Hoffman | 248/163.2 |
| 6,170,840 B1 | * | 1/2001 | Mathias | 280/87.041 |
| 6,305,653 B1 | * | 10/2001 | Oldham et al. | 248/177.1 |
| 6,349,905 B1 | * | 2/2002 | Mills | 248/126 |
| 6,371,429 B1 | * | 4/2002 | Gillespie | 248/354.1 |
| 6,695,268 B1 | * | 2/2004 | Hsieh | 248/188.7 |
| 6,710,236 B2 | * | 3/2004 | Takegawa | 84/421 |
| 6,796,536 B1 | * | 9/2004 | Sevier, IV | 248/121 |

FOREIGN PATENT DOCUMENTS

| | | |
|---|---|---|
| DE | 42 30 856 | 3/1994 |
| EP | 0532970 A1 * | 1/1992 |

* cited by examiner

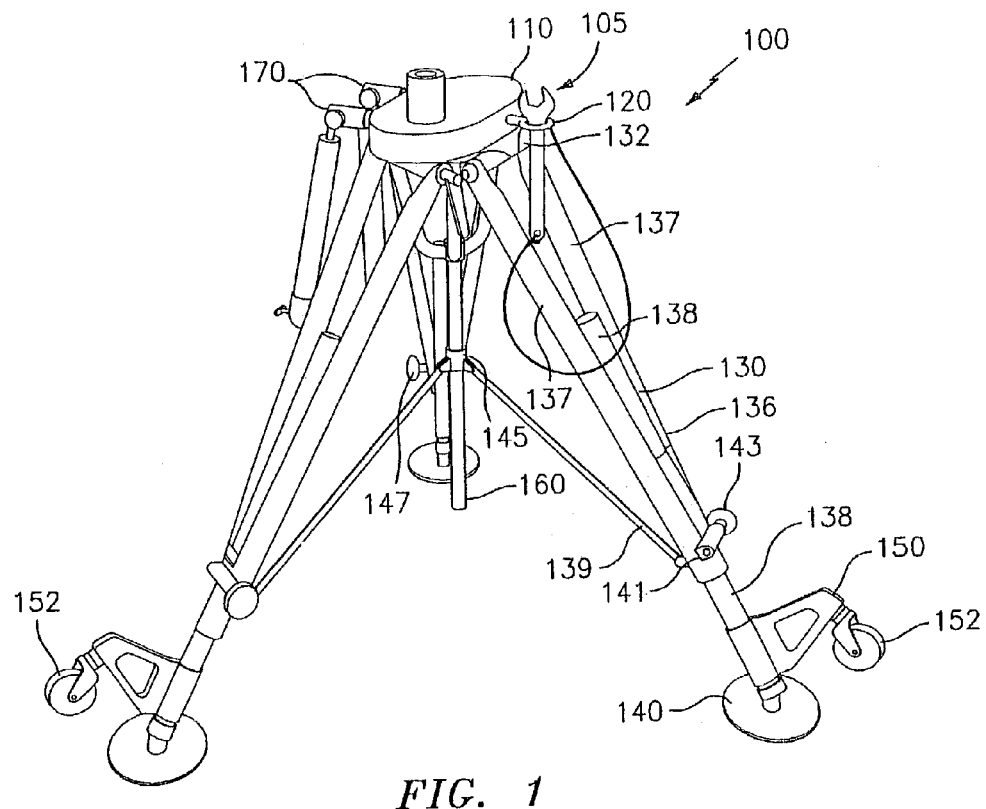
FIG. 1
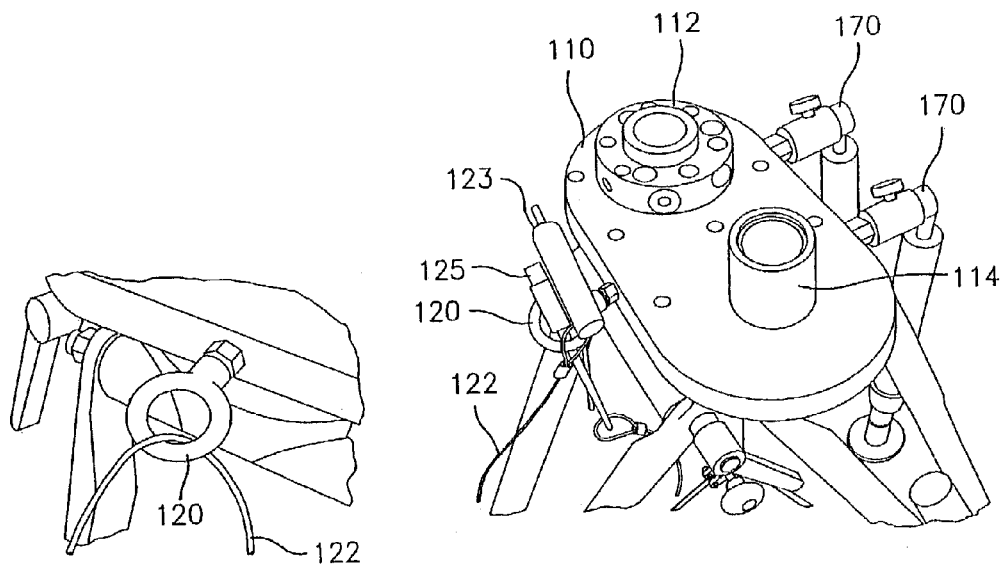
FIG. 4a
FIG. 4

TRIPOD AND METHOD

CROSS REFERENCE TO RELATED APPLICATIONS

The present application claims priority to U.S. Provisional Patent Application Ser. No. 60/365,734, filed Mar. 19, 2002, the entire contents of which are specifically incorporated herein by reference.

TECHNICAL FIELD

This present disclosure relates to tripods. More specifically, this disclosure relates to exemplary tripods suitable for supporting a three dimensional coordinate measurement apparatus and method of use thereof.

BACKGROUND

There are many instances where a stable support is required to ensure that the object or device being supported remains fixed with respect to a solid surface such as a floor. For example, laboratory equipment and measurement equipment, such as three-dimensional coordinate measurement instrument, are often required to remain fixed with respect to a sturdy object or the floor to ensure that the relative position between the measurement device and the object being measured remains fixed.

One common method of ensuring stability of an apparatus has been physically bolting the apparatus to a sturdy table or floor. However, this method requires permanently altering the table or floor and makes repositioning difficult.

U.S. Pat. No. 5,402,582, issued on Apr. 4, 1995 to Simon Raab and wholly incorporated herein by reference, shows a prior art floor stand support at FIG. 3 having a three-dimensional coordinate measuring device and monitor stand supported by a large-diameter post 24 and angled support legs extending up from a solid platform. Such a design is sufficiently sturdy to allow the coordinate measurement device to easily measure coordinates within a spherical space ranging from six to eight feet (1.8-2.4 m) in diameter with a measuring accuracy of 2⑨±0.005 inch (0.13 mm), wherein ⑨=one standard deviation.

However, it would be desirable to provide a support that is at least as sturdy as the prior art support, but one that is easily moved from one place to another within a room and collapsed for storage or transportation.

Tripods are well known in the prior art for providing a stable support that is collapsible. However, for some applications, they are not stable enough. Specifically, in applications where the center of mass of the supported device is moved from directly above the center of the tripod, the bending moment imposed on the tripod legs can cause impermissible movement of the supported device, particularly in sensitive measurement applications such as that discussed above.

In addition, existing tripods remain difficult to move from one location to another. For example, if one wishes to move a device supported by a tripod from one location in a room to another location, he or she would have to lift the device and tripod together off the floor and carry it to the new location, while avoid tripping on the extended legs. If the legs collapse downwardly, then they then must be spread back out when the tripod reaches its destination. If the apparatus being supported by the tripod is very heavy, this compounds the difficulty of carrying it as the whole assembly becomes top-heavy.

While the tripod's ability to be collapsed for storage and transportation has made them indispensable in many fields since their introduction, they remain cumbersome to set up and take down, particularly where hand tools are required for tightening clamps and other adjustments in the case of heavy-duty tripods. One reason for this difficulty is that there has not been adequate provisions in prior art tripods for storing needed hand tools so that they are readily available.

SUMMARY

The above-discussed and other drawbacks and deficiencies of the prior art are overcome or alleviated by a novel tripod having an extensible strut for stabilizing purposes. In another aspect, a novel caster wheel mechanism permits easy relocation of the tripod. In another aspect, a multi-function support is provided. In yet another aspect, a tool rack is provided supported by the tripod. In yet another aspect, a method of using a tripod includes attaching the tripod to a stable object.

The above-discussed and other features and advantages of the presently described tripod will be appreciated and understood by those skilled in the art from the following detailed description and drawings.

BRIEF DESCRIPTION OF THE DRAWINGS

The presently described tripod will now be described by way of example with reference to the accompanying drawings in which:

FIG. 1 shows a perspective view of an assembled exemplary tripod;

FIG. 4 shows a close up of the platform of the tripod;

FIG. 4a shows a close up of an exemplary tool rack attached to the platform;

DETAILED DESCRIPTION

Figure 2:
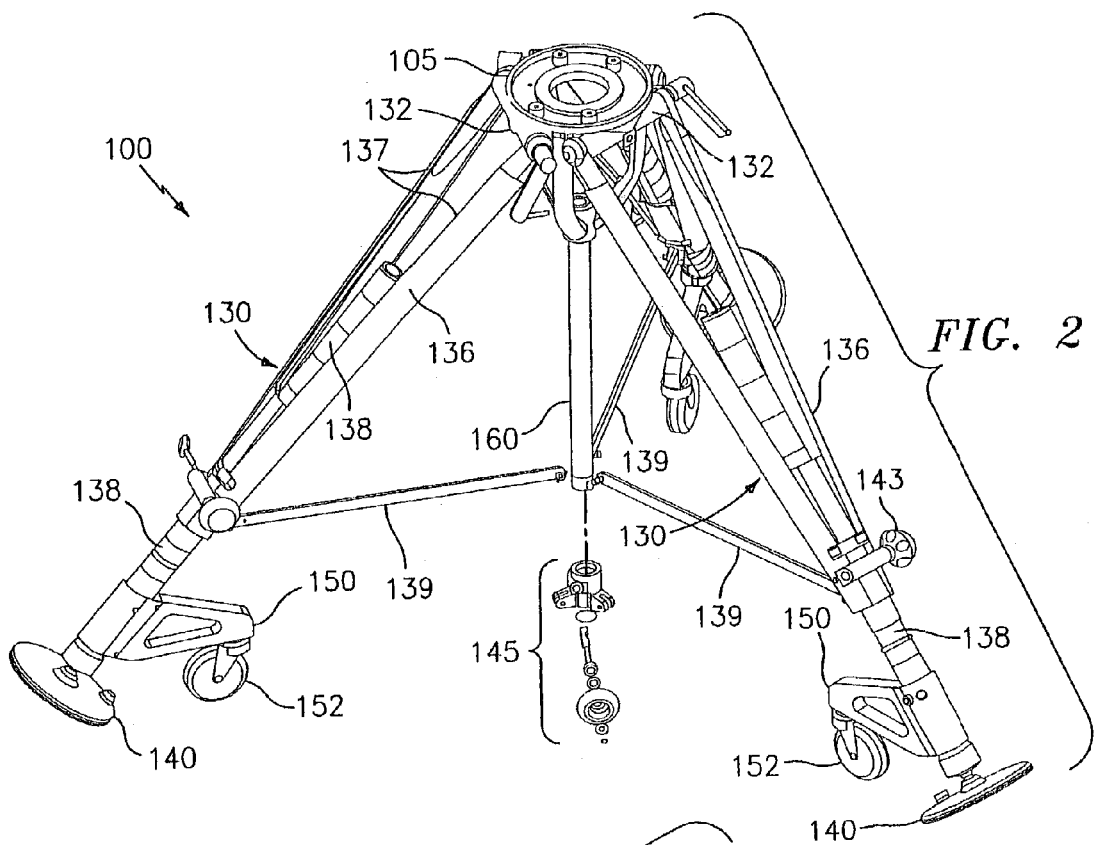
FIG. 2 shows a plan view of an assembled exemplary tripod.
Figure 3:
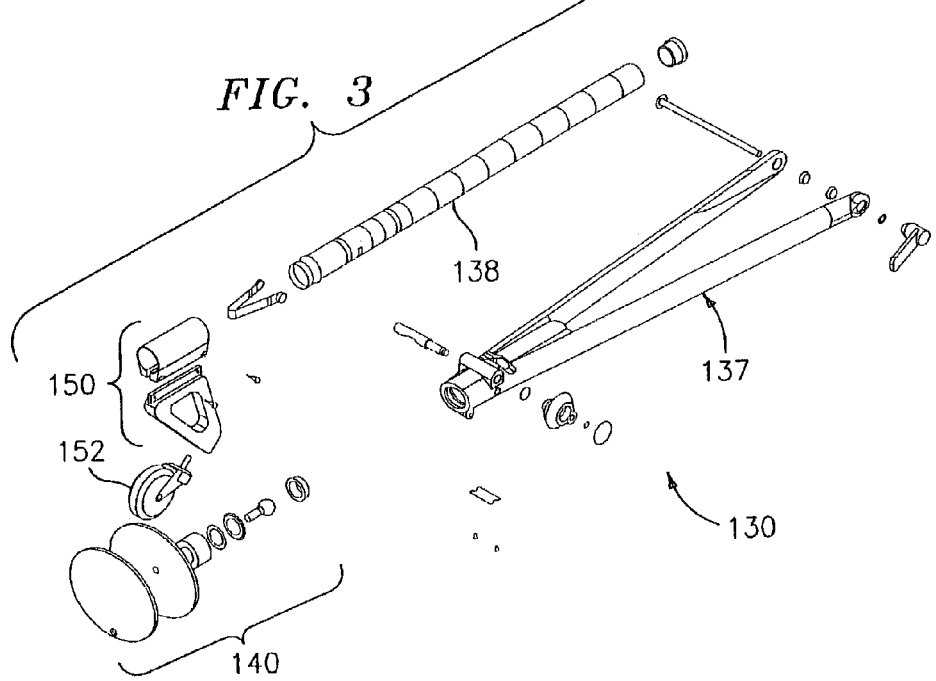
FIG. 3 shows an exploded view of a leg assembly of the tripod support.

FIGS. 1 and 2 show a tripod 100 having three legs 130 each comprising a crutch 136 and a lower leg 138. Each crutch 136 includes two crutch-struts 137 depending from a leg pivot 132 to a crutch clamp 143. Crutch clamp 141 includes a knob 143 for tightening crutch clamp 141 onto lower leg 138, thereby fixing said crutch clamp 141 to lower leg 138. Lower leg 138 is therefore adjustable and extensible from crutch 136. At a lower end of each lower leg 138 is a caster adapter 150 and pod 140. In an exemplary embodiment, caster adapters 150 are configured to pivot approximately 180° around lower legs 138 into either an engaged position, in which casters 152 are in contact with the floor and pods 140 are raised as shown in FIG. 2, or a disengaged position, in which casters 152 are raised off the floor and pods 140 are supporting tripod 100 as shown in FIG. 1. However, such pivot angle may be less than 180°, as long as such pivot is sufficient to disengage the casters from the horizontal floor.

Referring again to the exemplary embodiment illustrated by FIGS. 1 and 2, extending vertically downward between tripod legs 130 from head 105 is stay rod guide 160. Stays 139 extend from a stay rod yoke 145 to each crutch clamp 141 thereby coordinating legs 130. Stay rod yoke 145 includes a knob permitting stay rod yoke 145 to be clamped to stay rod guide 160 so that the collapse and expansion of legs 130 can be selectively prevented or permitted.

Figure 7:
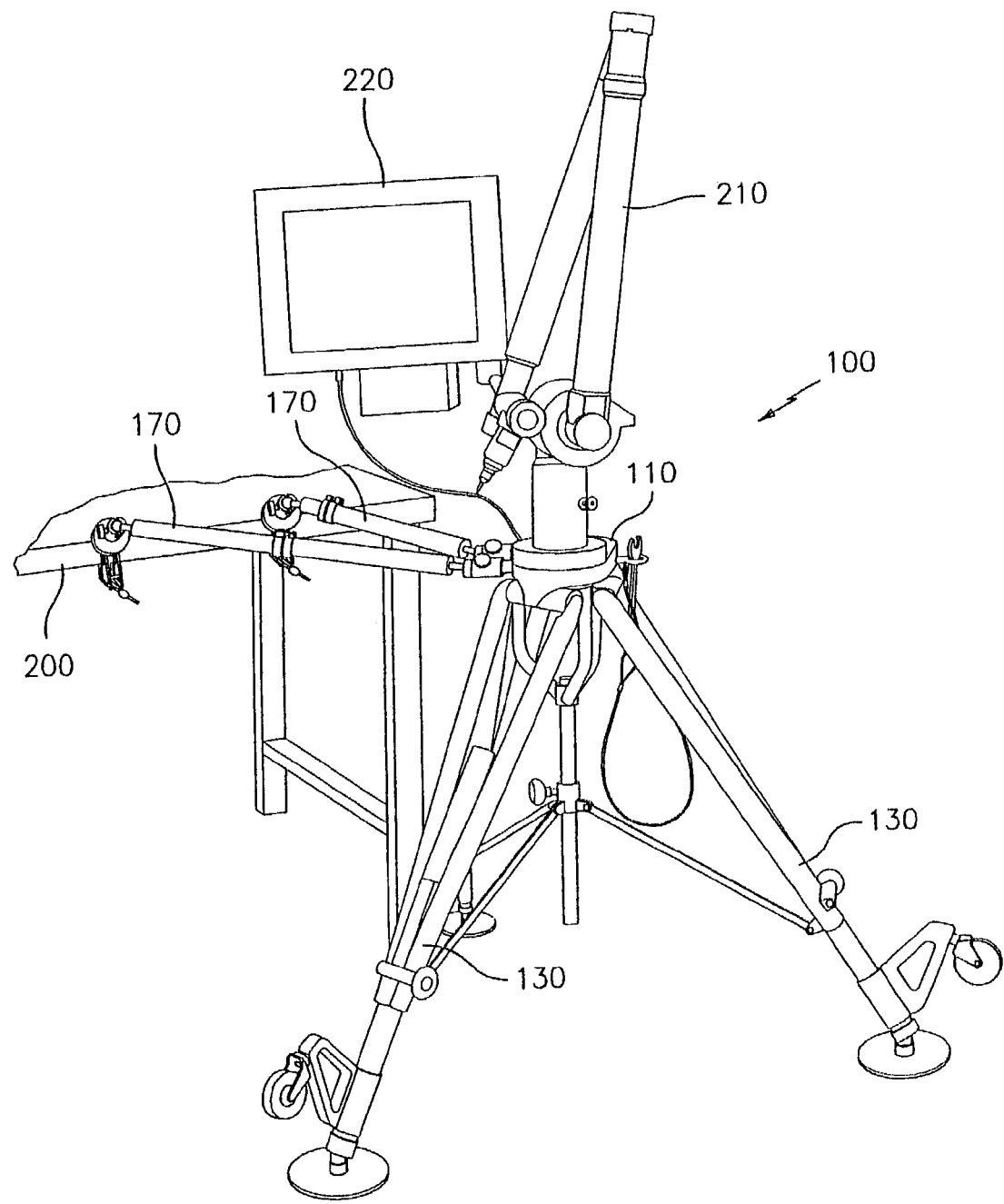
FIGS. 7-9 show exemplary tripods being stabilized by its struts and carrying a coordinate measuring apparatus and display.
Figure 8:
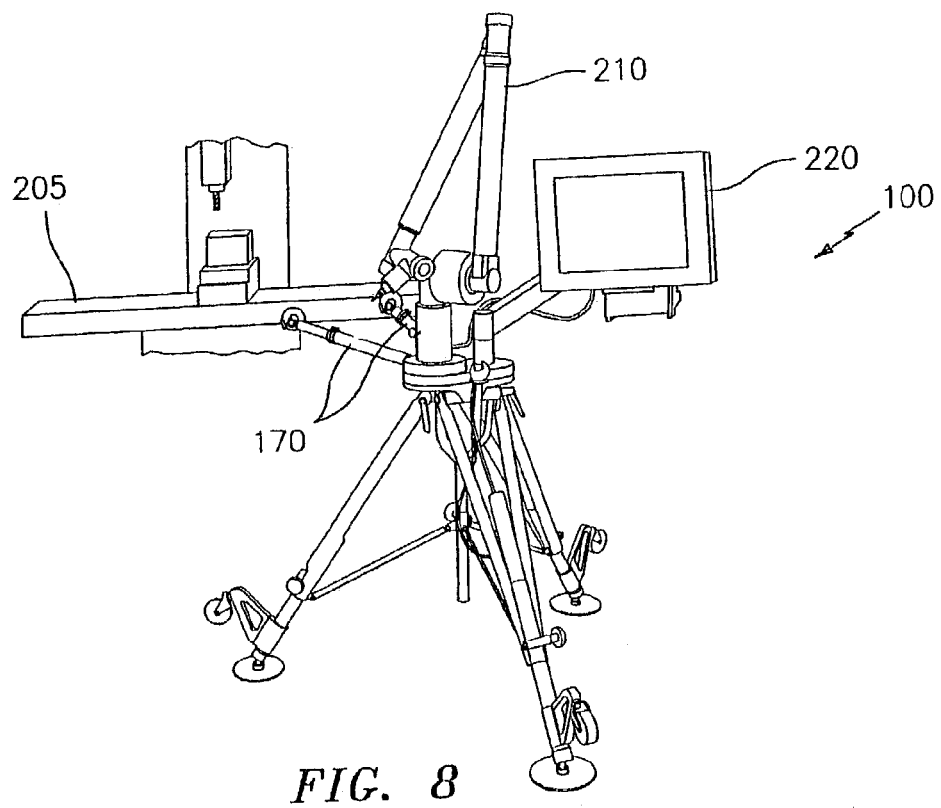

Exemplary platform 110 is bolted to head 105 using the threaded holes in head 105 shown in FIG. 2. Platform 110 includes, e.g., a first support 112 for attaching a three dimensional coordinate measurement apparatus and a second support 114 for attaching a computer display or monitor, as will be discussed below with reference to FIGS. 7-9. Attached to platform 110 is a tool rack 120 and one or more struts 170 (two shown).

Exemplary tool rack 120 will now be described with reference to FIGS. 4 and 4a. To the side of platform 110 is a tool rack 120 supporting a pair of tools including a wrench 125 and T-handle wrench 123. A cable 122 passes through a handle of T-handle wrench 123 and of wrench 125 thereby tying the tools to tripod 100, i.e., the rack 120 comprises a loop, or equivalent shaped aperture, through which the tools cannot pass and if both tools are removed, the cable will pass through the loop, effectively preventing either tool from being separated from tripod 100.

In an exemplary embodiment, opposite tool rack 120 on platform 110 are two struts 170 that are shown in FIGS. 1 and 4 hanging down. Each strut includes an extensible rod with a mounting bracket at its distal end. Although the struts 170 are attached directly to platform 110, they may be instead be mounted to head 105 or any other object fixed thereto, in which case the struts 170 would be indirectly attached to platform 110.

Figure 5:
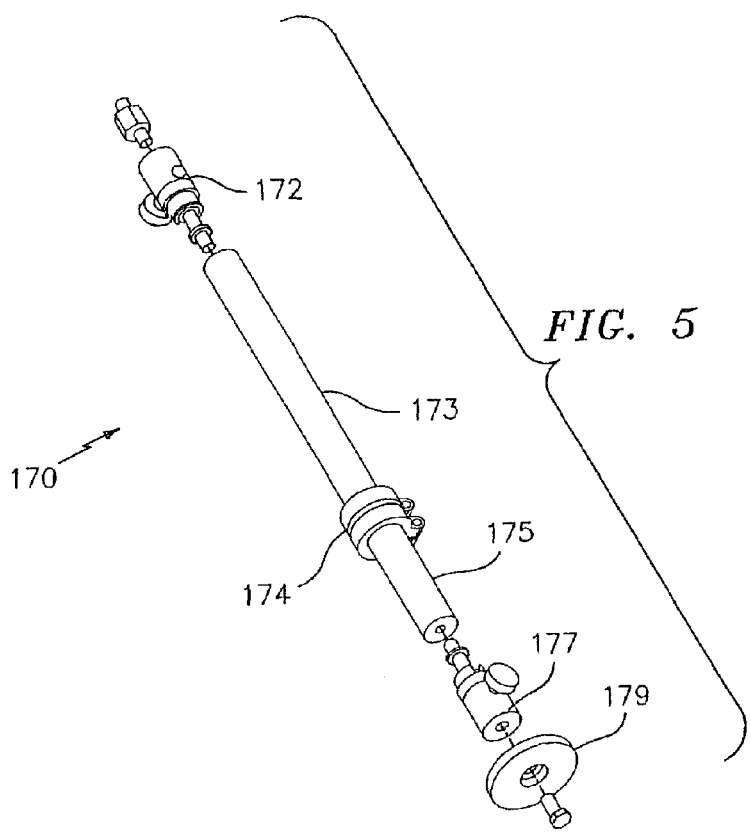
FIG. 5 shows an exploded view of a strut.
Figure 6:
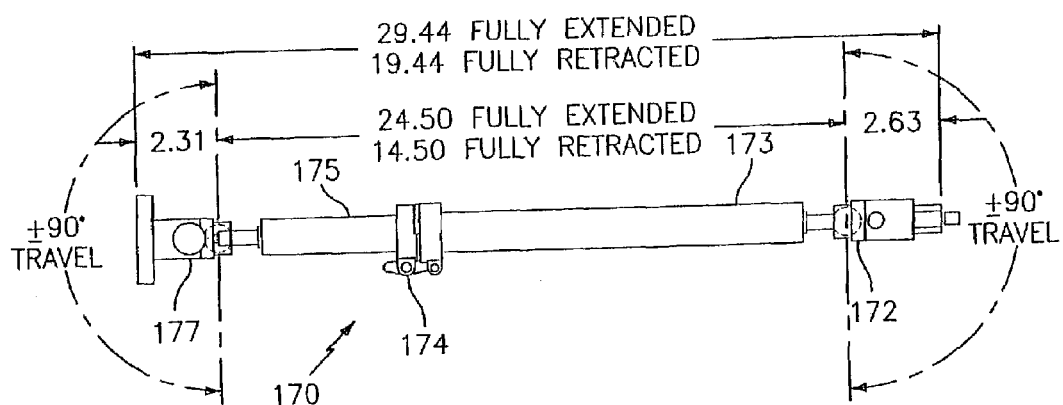
FIG. 6 shows a length view of the strut of FIG. 5.

Exemplary struts 170 are shown in detail in FIGS. 5 and 6. In one embodiment, at a proximal end portion, each strut 170 has a first ball joint 172 that is bolted or otherwise attached to platform 110. Extending from ball joint 172 is a first strut portion 173, which terminates in strut clamp 174. Strut clamp 174 is configured for clamping a second strut portion 175 that is received within first strut portion 173 and is extensible therefrom. First and second strut portions 173 and 175 therefore cooperate in a telescoping fashion, with strut clamp 174 acting to lock the two strut portions in place with respect to each other. At the distal end portion of second strut portion 175 is a second ball joint 177 and clamp disk 179. While ball joints 172 and 177 have been specified, it is to be recognized that other types of joints are contemplated for use with such arm.

Figure 9:
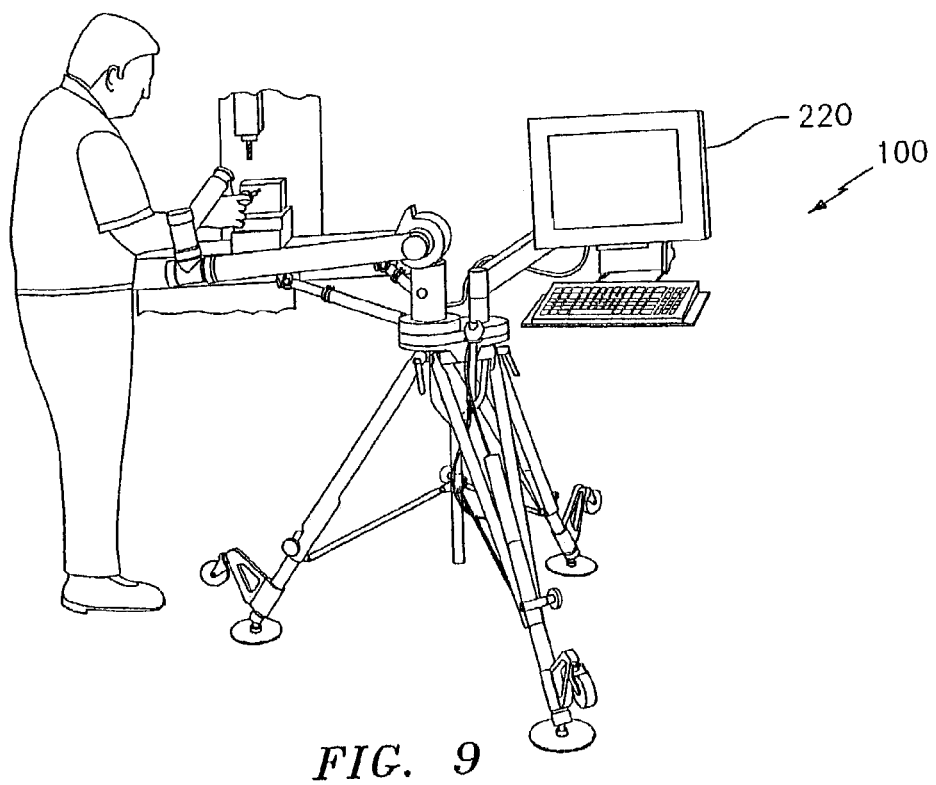

Struts 170 provide additional stability to tripod 100 by anchoring platform 110 to a solid object or wall. For example, tripod 100 is shown anchored to a table 200 in FIG. 7 by struts 170 clamped to an edge thereof. Mounted on platform 110 is a three dimensional coordinate measurement apparatus 210 and a computer display 220. Exemplary tripod 100 is again shown in FIG. 8, this time attached to workbench 205. FIG. 9 shows another view of the tripod 100, this time in use. It will be appreciated that struts 170 provide additional stability to tripod 100 when the center of mass of apparatuses 210 and 220 is moved from directly above the center of tripod 100.

While exemplary embodiments have been shown and described, various modifications and substitutions may be made thereto without departing from the spirit and scope of the invention. Accordingly, it is to be understood that the present invention has been described by way of illustration and not limitation.

What is claimed is:

1. A tripod for supporting an object or apparatus over a horizontal surface, the tripod comprising:
    at least three legs depending from a top;
    a pod at a lower end of each said leg, said pod constructed to engage the horizontal surface; and
    for each said leg, a caster adapter fitted at the lower end of said leg adjacent to said pod, said caster adapter extending radially away from said leg and supporting a caster, said caster adapter being pivotally disposed independently of said pod on said leg so that said caster can extend towards a center of said tripod or away from the center of said tripod, wherein when said caster adapters extend away from the center of said tripod and said legs are expanded, said casters are disengaged from the horizontal surface, and when said caster adapters extend toward the center of the tripod, said casters are engaged with the horizontal surface and said pods are disengaged from the horizontal surface thereby allowing said tripod to freely roll on said casters.

2. A tripod for supporting an object or apparatus over a horizontal surface, the tripod comprising:
    at least three legs depending from a top
    a platform fixed to said top, the platform being adapted to mount said object or apparatus thereto;
    at least one strut attached to said platform, said at least one strut comprising a telescoping extensible rod portion having a first end attached to said platform via a first joint and a second end having a clamp, said extensible rod portion including a strut clamp for selectively preventing said rod portion from extending when said strut is under tension and retracting when said strut is under compression, wherein said first joint is a first ball joint, further comprising a second strut attached to said platform, said second strut being substantially identical to said first strut.

3. The tripod of claim 2 wherein said strut and said second strut are attached adjacent to each other to said platform.

4. The tripod of claim 2 wherein said at least one strut and said second struts are attached directly to said platform.

5. The tripod of claim 2 wherein each said at least one strut and said second strut include a second ball joint at the second end thereof.

6. The tripod of claim 2 further comprising:
    a pod at the lower end of each said leg, said pod constructed to engage the horizontal surface; and
    for each said leg, a caster adapter fitted at a lower end of said leg adjacent to said pod, said caster adapter extending radially away from said leg and supporting a caster, said caster adapter being pivotally disposed on said leg so that said caster can extend towards a center of said tripod or away from the center of said tripod, wherein when said caster adapters extend away from the center of said tripod and said legs are expanded, said casters are disengaged from the horizontal surface, and when said caster adapters extend toward the center of the tripod, said casters are engaged from the horizontal surface and said pods are disengaged from horizontal surface thereby allowing said tripod to freely roll on said casters.

7. A tripod for supporting an object or apparatus over a horizontal surface, the tripod comprising:
    at least three legs depending from a top;
    a platform fixed to said top, the platform being adapted to mount said object or apparatus thereto;
    at least one strut attached to said platform, said at least one strut comprising a telescoping extensible rod portion having a first end attached to said platform via a first joint and a second end having a clamp, said extensible rod portion including a strut clamp for selectively preventing said rod portion from extending when said strut is under tension and retracting when said strut is under compression, wherein said first joint is a first ball joint, further comprising
    a pod at a lower end of each said leg, said pod constructed to engage the horizontal surface; and for each said leg, a caster adapter fitted at a lower end of said leg adjacent to said pod, said caster adapter extending radially away from said leg and supporting a caster, said caster adapter being pivotally disposed on said leg so that it can extend towards a center of said tripod or away from the center of said tripod, wherein when said caster adapters extend away from the center of said tripod and said legs are expanded, said casters are disengaged from the horizontal surface, and when said caster adapters extend toward the center of the tripod, said casters are engaged from the horizontal surface and said pods are disengaged from horizontal surface thereby allowing said tripod to freely roll on said casters.

8. A tripod for supporting an object or apparatus over a horizontal surface, the tripod comprising:
at least three legs depending from a top;
a platform fixed to said top, the platform being adapted to mount said object or apparatus thereto;
at least one strut attached to said platform, said at least one strut comprising a telescoping extensible rod portion having a first end attached to said platform via a first joint and a second end having a clamp, said extensible rod portion including a strut clamp for selectively preventing said rod portion from extending when said strut is under tension and retracting when said strut is under compression,
a pod at the lower end of each said leg, said pod constructed to engage the horizontal surface;
for each said leg, a caster adapter fitted at a lower end of said leg adjacent to said pod, said caster adapter extending radially away from said leg and supporting a caster, said caster adapter being pivotally disposed on said leg so that it can extend towards a center of said tripod or away from the center of said tripod, wherein when said caster adapters extend away from the center of said tripod and said legs are expanded, said casters are disengaged from the horizontal surface, and when said caster adapters extend toward the center of the tripod, said casters are engaged from the horizontal surface and said pods are disengaged from horizontal surface thereby allowing said tripod to freely roll on said casters;
a pair of hand tools;
a tool rack attached to said platform, said tool rack having an opening through which only a part of each of said pair of hand tools may pass, thereby allowing said tool rack to support said pair of hand tools; and
a cable extending from one of said pair of hand tools to another of said pair of hand tools, said cable passing through said opening when both of said pair of hand tools are removed from said rack.

9. The tripod of claim 8 wherein said tool rack is attached directly to said platform on a side opposite thereof of said strut.

10. A tripod for supporting an object or apparatus over a horizontal surface, the tripod comprising:
at least three legs depending from a top;
a platform fixed to said top, the platform being adapted to mount said object or apparatus thereto;
at least one strut attached to said platform, said at least one strut comprising a telescoping extensible rod portion having a first end attached to said platform via a first joint and a second end having a clamp, said extensible rod portion including a strut clamp for selectively preventing said rod portion from extending when said strut is under tension and retracting when said strut is under compression;
a pair of hand tools;
a tool rack attached to said platform, said tool rack having an opening through which only a part of each of said pair of hand tools may pass, thereby allowing said tool rack to support said pair of hand tools; and
a cable extending from one of said pair of hand tools to another of said pair of hand tools, said cable passing through said opening when both of said pair of hand tools are removed from said rack.

11. The tripod of claim 10 wherein said tool rack is attached directly to said platform on a side opposite thereof of said strut.

12. A tripod for supporting an object or apparatus over a horizontal surface, the tripod comprising:
at least three legs depending from a top;
a platform fixed to said top, the platform being adapted to mount said object or apparatus thereto;
a pair of hand tools;
a tool rack attached to said platform, said tool rack having an opening through which only a part of each of said pair of hand tools may pass, thereby allowing said tool rack to support said pair of hand tools; and
a cable extending from one of said pair of hand tools to another of said pair of hand tools, said cable passing through said opening when both of said pair of hand tools are removed from said rack.

13. A method of using a tripod, said method comprising:
positioning said tripod in a desired location adjacent a sturdy object with legs spread a desired amount for stability;
extending a strut from said tripod to said sturdy object;
fixing said strut to both said tripod and said sturdy object to further lend support to said tripod; and
extending a second strut from said tripod to said sturdy object to further lend support to said tripod, said second strut being attached to said sturdy object at a location that is some distance from another location that the strut is attached to said sturdy object.

* * * * *

UNITED STATES PATENT AND TRADEMARK OFFICE
CERTIFICATE OF CORRECTION

PATENT NO. : 7,604,207 B2  Page 1 of 1
APPLICATION NO. : 10/392056
DATED : October 20, 2009
INVENTOR(S) : Hasloecher et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 686 days.

Signed and Sealed this

Fifth Day of October, 2010

David J. Kappos
*Director of the United States Patent and Trademark Office*